July 10, 1945.   E. L. KILPATRICK   2,379,909
DETERMINING VERTICAL ANGLE OF INCIDENCE OF RADIO WAVES
Filed Oct. 3, 1942

THRESHOLD OF AURAL
SENSITIVITY OF SIGNAL

INVENTOR
EDWARD L. KILPATRICK
BY
ATTORNEY

Patented July 10, 1945

2,379,909

UNITED STATES PATENT OFFICE 2,379,909

DETERMINING VERTICAL ANGLE OF INCIDENCE OF RADIO WAVES

Edward L. Kilpatrick, Arlington, Va.

Application October 3, 1942, Serial No. 460,626

6 Claims. (Cl. 250—11)

(Granted under the act of March 3, 1883, as amended April 30, 1928; 370 O. G. 757)

The invention described herein may be made and used by and for the Government of the United States for governmental purposes without the payment to me of any royalty therefor.

This invention relates particularly, but not exclusively, to determining vertical angle of incidence of radio waves and aims generally to improve the sensitivity of systems of such nature.

In using the system prepared by W. L. Clemmer, Patent No. 2,269,437, granted January 13, 1942, employing the Clemmer loop oriented, as shown in his drawings, in a resultant flux field inclined at about 20° to 25° from horizontal, which field was produced by a single wire flat-top antenna about 75 feet long and 50 feet above the ground, it was found in searching vertical angles with the loop on an aircraft at various altitudes where the vertical angle to the transmitter ranged from 15° to 45°—

(1) That the null for rotation of the loop about the planar axis directed toward the transmitter, with a given receiver, was well defined, but (2) That the null for swing of the said planar axis in the vertical plane of azimuth (EFGH, Fig. 1, herein), with the same receiver, was not well-defined, but quite broad, nearly ±15°, this broadness being fairly constant at all altitudes above 100 feet.

These observations are illustrated in Fig. 5 herein, in which: (1) the broken curve, corresponding to the flux threading the Clemmer loop, shows its rapid growth, as represented by amplitude of signal measured vertically along NY on rotation of the loop plane in the plus or minus direction from alignment with the resultant flux lines, and shows that this growth varies as the cosine of the rotary angle of departure; (2) the unbroken curve, similarly corresponding, shows the slower rate of growth of flux or signal amplitude measured vertically along NY, on swinging of the planar axis of the Clemmer loop in the vertical plane in the plus or minus direction from its alignment with the angle of incidence of the wave front, and shows that this growth in the NY direction varies as the sine of the angle of swing measured along the NX axis; (3) the narrow range 1 over which a null (i. e. signal, if any, below the threshold of aural sensitivity) occurs for rotation of the loop about the planar axis, and the wider range 2 over which a null occurs for swing of the planar axis, measured in the OX direction at the threshold of audibility, shows the directional sensitivity in each case to be dependent on the shape of the respective curve.

One object of the present invention is to provide an improved system obviating this observed lack of directional sensitivity to swing of the planar axis.

Another object is to provide an improved form of loop having sharp directional sensitivity to the angle of deviation of the loop system when swung, in a plane traversed by components of magnetic flux, from the null direction of the loop system in said plane.

Further objects and advantages will appear from the following description of a preferred embodiment of the invention shown in the accompanying drawing, in which:

Figs. 2a and 3a are vector diagrams of the resultant voltages induced in the system in the orientations of Figs. 2 and 3.

Figure 5:
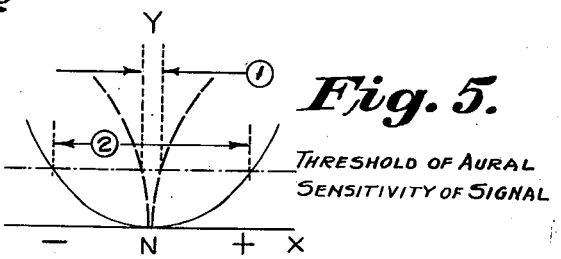

As above noted, Fig. 5 is a diagram illustrating the conditions improved upon by the application of the present invention in vertical direction finding.

Figure 1:
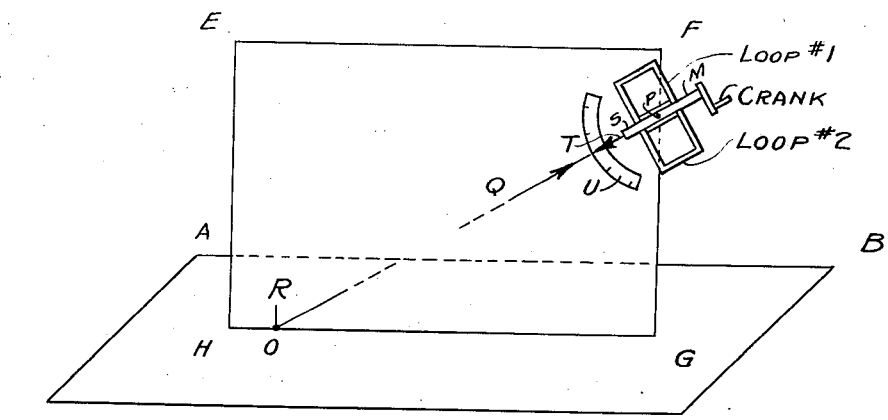
Fig. 1 is a diagram in perspective of one application of the new method and means of the present invention.

Referring to the illustrative embodiment in detail, in the diagram of Fig. 1, the horizontal plane ABCD represents the surface of the earth and contains the base of a radio transmitting antenna R. The vertical plane EFGH contains point P of the loop system and the radio transmitting antenna R and intersects plane ABCD on the line OG. Angle GOP is the vertical angle of incidence at point P of the radio wave originating at R, it being understood, of course, that for this angle, the point O (Fig. 1) lies at the apparent source of the energy received, as indicated by the normal P—Q to the wave front at P.

This point P represents the center of orientation of the loop system of the present invention, which may be carried by an aircraft or the like, and the plane EFGH thus represents the vertical plane extending in azimuth from the aircraft to the transmitter, the azimuthal direction of which is determined by ordinary horizontal direction-finding means, as in the Clemmer patent, for example, and in which the axis S—M of the loop system is swingably and rotatably positioned as in the Clemmer patent for example.

In other words, the plane EFGH is a predetermined plane having a magnetic flux component of the wave perpendicular to it, and in which it is desired to sharply determine the direction of incidence of the wave by swinging into alignment with said direction a planar axis of a loop system while maintaining that axis in said plane. Specifically, in the application in Fig. 1, the radio wave has a vertically polarized electric component, and hence a horizontal component of magnetic flux perpendicular to the plane EFGH, and the directional system consists of two identical conducting loops rigidly mounted with respect to each other in symmetrical co-planar relation on opposite sides of the axis of a shaft SM. The axis of the shaft SM constitutes a planar axis of the loop system so that the loop plane is rotatable about this planar axis, by any suitable means, such as the means shown in the Clemmer patent.

In addition the shaft SM is pivoted at P so that it is rotatable or tiltable in the plane in which the angle is to be measured, herein the vertical plane, about an axis perpendicular to SM and passing through the point P. Suitable calibrated means is employed, herein shown as a pointer T attached to the directional loop system and coincident with the planar axis SM, which swings over a graduated circular arc U as the axis SM is pivoted about the point P.

Manipulation

In employing the system, to determine the vertical or three dimensional angle of incidence of the energy waves, the azimuthal direction to the transmitter, i. e., plane EFGH, is determined in any suitable way, and the axis SM is brought into the plane EFGH. The loop system is then rotated about axis SM until a substantial, preferably the maximum, voltage is induced in each loop by the radio wave emitted by R. This condition may be determined in any suitable way, as by merely detecting the resultant voltage $E_r$ with the loop system in a misaligned position in Fig. 3, and then rotating the so misaligned system about axis SM to a position of maximum or satisfactory signal amplitude.

Figure 4:
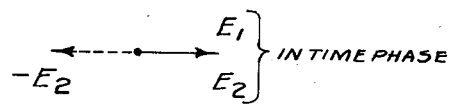
Fig. 4 is a diagram of a modified arrangement.
Figure 4:
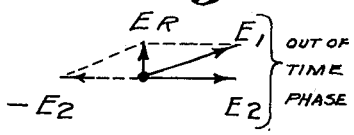
Figure 4:
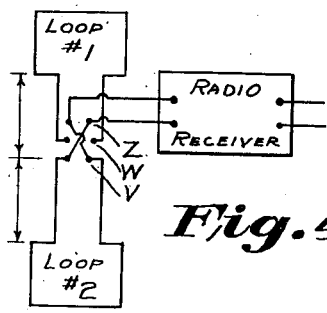

Another of the several modes which may be adopted is illustrated in Fig. 4, in which loop No. 2 is connected to a pair of double-pole switch points V which are directly connected to the receiver so that loop No. 2 is permanently in the receiver circuit, while loop No. 1 is connected to double pole switch blade points W adapted to be electrically joined to points V to connect loop No. 1 to the receiver in the manner shown. Thus, with double pole switch V—W open, loop No. 2 only is connected to the receiver; with double pole switch V—W closed, both loops are connected to the receiver in null-producing relation. With this arrangement the electrical length of connections from both identical loops to receiver take-off points V should be the same for best results, and it will be apparent that with double pole switch V—W closed the two loops are connected in series with each other to form one continuous double-loop, with the receiver connected to diametrically opposite points of electrical symmetry in said double-loop, as in Fig. 2. If desired, an additional pair of switch points Z may be provided, connected to form with points V and blade points W a double-pole double throw reversing switch, as shown. With this arrangement the two loops may be connected in parallel relation for signal-pickup purposes or for producing an augmented signal to assist in determining the desired rotated position of the loops relative to axis SM; or for operation, if desired, with both loops in parallel, to yield the maximum signal instead of a null, when alignment is reached, as is contemplated by this invention.

The angle between the plane of the loops and the vertical plane EFGH having thus been adjusted for satisfactory, preferably maximum, sensitivity, the loop system is next swung about the axis through point P until the voltages induced in each loop by the radio wave arriving from R are in time phase. When this condition is attained, the resultant voltage applied to the detector is zero and a pure null is obtained, coincident with which the angle of incidence of the wave front, in plane EFGH is indicated, hereby by pointer T juxtaposed to protractor scale U. The axis SM at this time is aligned with the direction of incidence of the wave point from the transmitter.

Electrical operation

For the purpose of illustrating the electrical operation of the loop system, reference may be had to Figs. 2, 2a, 3 and 3a herein, in which, for simplicity, single turn square loops are considered, though it will be appreciated that other forms of loops may be employed.

Figure 2:
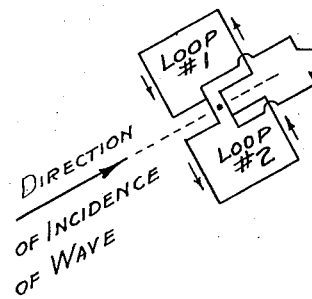
Figs. 2 and 3 are diagrams showing the loop system in alignment and swung from alignment, respectively, with the direction of incidence of the radio waves.

Fig. 2 shows the two identical conducting loops in the same plane and fixed relative to each other as oriented so that their adjacent legs coincide with the direction of incidence of a radio wave having a component of magnetic flux perpendicular to the plane of the loops. With this orientation the induced voltages existing in the adjacent legs of the loops will be equal in magnitude and opposite in phase so that a pure null will be obtained at a detecting device connected into the adjacent legs as shown in Fig. 2.

The arrow heads in Fig. 2 indicate the senses of the resultant induced voltages in the respective loops at a given instant. Fig. 2a is a vector diagram of these voltages. The voltage applied to the detector is $E_1-E_2$. For the orientation of the loop system illustrated in Fig. 2, $E_1$ and $E_2$ are in phase and since they are equal in magnitude by virtue of the fact that the loops are identical, the resultant voltage applied to the detector is zero.

Figure 3:
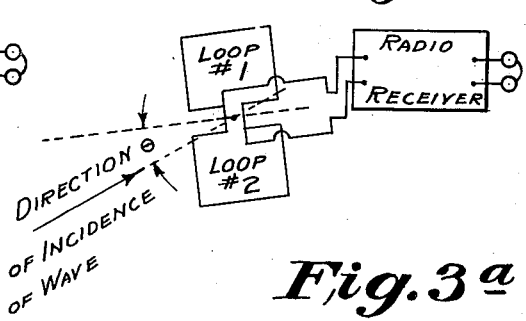

Fig. 3 illustrates the conditions obtained by rotating the loop system of Fig. 2 through an angle $\theta$ about an axis perpendicular to the plane of the loops. In this case the induced voltage acting in loop No. 1 lags behind that in loop No. 2 by the time angle $\theta$ which is $\sin^{-1}(D \sin \theta)$, where D is the distance between the geometric centers of the loops expressed in wave lengths of the incident radio wave. The voltage applied to the detector for this condition is the vector difference of $E_1$ and $E_2$, or $E_r$ in the diagram of Fig. 3a.

From Fig. 3a the magnitude of $E_r$ is:

$$E_r = \sqrt{2E}\sqrt{1-\cos(D \sin \theta)} = 2E \sin\left(\frac{D}{2} \sin \theta\right) \quad \textit{1}$$
$$(\text{where } E = E_1 = E_2)$$

Since for small values of an angle, the sine of the angle is very nearly equal to the angle in radians, Equation 1 can be written.

$$E_r = ED\theta, \text{ when } \theta \text{ is small} \quad \textit{2}$$

Directional sensitivity may be defined as the rate of change in magnitude or $E_r$ with respect to the angle of deviation $\theta$ of the loop system from the null direction.

Directional sensitivity =

$$\frac{dE_r}{d\theta} = ED \cos\left(\frac{D}{2} \sin \theta\right) \cos \theta \quad \textit{3}$$

For small values of $\theta$, Equation 3 may be written.

$$\text{Directional sensitivity} = ED \cos \frac{D\theta}{2} \qquad 4$$

Directional sensitivity as used in this discussion applies to the angle in the plane of the loop system only. The loop system described above has no directional sensitivity in the plane at right angles to its own.

An idea of the quantitative value of the directional sensitivity of the loop system of Figs. 2 and 3 may be obtained by comparing it with the familiar directional sensitivity of a single loop of the same dimensions as one of the loops of the system when oriented so that its plane is normal to the incident radio wave and it is rotated through an angle $\theta$ in a plane at right angles to its own and to the plane of polarization of the incident radio wave. Then if $E_2$ is the voltage induced in each leg, $E'_r$ the resultant induced voltage acting around the loop may be shown to be:

$$E'_r = 2E_1 \sin\left(\frac{D}{2} \sin \theta\right) \qquad 5$$

The maximum value of $E_r$ will occur when the loop is rotated into the position at right angles to the loop system of Fig. 2a, that is, when $\theta = 90°$. Then $$(\theta = 90°) E'_r = E = 2E_1 \sin\left(\frac{D}{2}\right) \qquad 6$$

Substituting in Equation 1 the value of E from Equation 6:

$$E_r = 4E_1 \sin\left(\frac{D}{2}\right) x \sin\left(\frac{D}{2} \sin \theta\right) \qquad 7$$

From Equations 5 and 7:

$$\frac{E_r}{E'_r} = 2 \sin\left(\frac{D}{2}\right) \qquad 8$$

The right hand member of Equation 8 also gives the ratio of the directional sensitivities of the single loop to the dual system as described above. In order to make this ratio unity, $$\sin\left(\frac{D}{2}\right) \text{ must equal } 0.5, \text{ or } D = \frac{1}{6}$$

However, if the spacing between the centers of the two loops is increased from D to D', the dimensions of the loops remaining fixed, the directional sensitivity is increased in the ratio $$\frac{D'}{D}$$

and the frequency of the incident radio wave required to make the right hand member of Equation 8 unity is $$\frac{D}{D'}$$

times that required when the center to center spacing is equal to the length of a side of one of the loops.

The above discussion of single turn square loops holds for multi-turn loops if $E_1$ and $E_2$ are the resultant voltages induced in the loops. The vector diagrams and equations hold only for square or round loops. If the loops are rectangular, the magnitude of the resultant voltages $E_1$ and $E_2$ is not constant as the angle $\theta$ is varied.

It will be apparent from the foregoing description that this invention in its broader aspects is not limited to the particular details of the preferred embodiment disclosed to illustrate the same. For example, the indication of vertical angle may be combined with a horizontal base line, as in the Clemmer patent, and the details of the loops and their connections may be varied within the scope of the appended claims.

I claim as my invention:

1. A loop system for measuring the vertical angle of incidence of energy waves, having a planar axis mounted in the vertical plane of incidence of the waves and tiltable about an axis perpendicular thereto, and comprising a pair of identical loop antennas mounted in symmetrical co-planar relation on opposite sides of said planar axis with their plane rotatable about said planar axis, a receiver connected to receive voltages from said two loops in mutually subtracting relation, said loop-plane being rotated about said planar axis to orient the loops in a flux cutting position which may be their maximum flux cutting position in said energy waves, and said planar axis being maintained tilted, as well as may be, at such angle in said vertical plane as to be normal to the wave front in said vertical plane; whereby a sharp null is obtained in said position, and a voltage is received by said receiver from said loops, on departure of said axis from said normal position, resulting from difference in time phase of the voltages generated in said loops by the energy waves.

2. A loop system for measuring the three-dimentional angle of incidence of radio waves, having a planar axis maintained, as well as may be, in alignment with the direction of incidence of the waves, comprising a pair of identical loop antennas mounted in symmetrical co-planar relation on opposite sides of said axis with their plane rotatable about said axis and a receiver connected to receive voltages from said two loops in mutually subtracting relation when said loops are rotated about said axis to flux cutting positions; whereby a sharp null is obtained while said axis is in alignment with the direction of incidence of the waves, and a voltage is received by said receiver from said loops, on departure of said axis from such alignment, resulting from difference in time phase of the voltages generated in said loops by the energy waves.

3. In the art of measuring the vertical angle of incidence of energy waves with a loop antenna system having a pair of identical loop antennas mounted in symmetrical co-planar relation on opposite sides of a planar axis of the system, the method which consists in positioning said planar axis in the azimuthal plane of incidence of the waves, rotating the plane of the loops about said axis to a flux cutting position with respect to the incident waves, and tilting said axis in said azimuthal plane until the voltages generated in said loops by the energy waves are in time phase with each other, whereupon the angular position of said planar axis in said azimuthal plane corresponds with the vertical angle of incidence of said energy waves.

4. In the art of measuring the three-dimentional angle of incidence of radio waves with a loop antenna system having a pair of identical loop antennas mounted in symmetrical co-planar relation on opposite sides of a planar axis of the system, the method which consists in moving said axis in three dimensions to a position in which the voltages generated in said loops by the radio waves, when said loops are rotated about said axis to flux cutting positions, are in time phase with each other, whereupon the three-dimensional angular position of said axis coincides with the three-dimensional angle of incidence of the radio waves.

5. A loop system according to claim 2, in which said receiver is connected to one of said two loops and in which means is provided for connecting the other of said loops in symmetrical series relation to said first loop for measuring purposes and for disconnecting the same for pick-up purposes.

6. A loop system according to claim 2, in which said receiver is connected to one of said two loops and in which means is provided for optionally connecting the other of said loops in symmetrical series relation to said first loop for measuring purposes and in parallel therewith for pick-up purposes.

EDWARD L. KILPATRICK.